United States Patent
Franklin

(10) Patent No.: US 8,135,288 B2
(45) Date of Patent: Mar. 13, 2012

(54) SYSTEM AND METHOD FOR A PHOTONIC SYSTEM

(75) Inventor: James D. Franklin, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 527 days.

(21) Appl. No.: 12/365,022

(22) Filed: Feb. 3, 2009

(65) Prior Publication Data
US 2010/0196013 A1 Aug. 5, 2010

(51) Int. Cl.
*H04B 10/04* (2006.01)
(52) U.S. Cl. ........ 398/196; 398/115; 398/140; 398/209; 398/194; 398/195; 398/197; 398/201; 398/204; 398/159; 398/162; 372/32; 372/34; 372/36; 372/38.02
(58) Field of Classification Search .................. 398/115, 398/135, 136, 137, 138, 139, 164, 158, 159, 398/141, 183, 184, 185, 186, 187, 188, 182, 398/192, 193, 194, 195, 196, 197, 198, 202, 398/204, 205, 206, 207, 208, 209, 213, 214, 398/81, 82, 87, 116, 200, 201, 212, 162, 398/140; 372/32, 34, 36, 38.02, 96, 102
See application file for complete search history.

(56) References Cited

U.S. PATENT DOCUMENTS 6,766,116 B2 * 7/2004 Webb ............................ 398/196
7,877,020 B1 * 1/2011 Hayes et al. .................. 398/198
2003/0058509 A1 * 3/2003 Webb et al. ................... 359/187
2007/0071456 A1 * 3/2007 Chen et al. .................... 398/204
2009/0169213 A1 * 7/2009 Lowery et al. ................. 398/98

OTHER PUBLICATIONS

Wang et al., "All-Optical Microwave Bandpass Filters Implemented in a Radio-Over-Fiber Link", IEEE Photonics Technology Letters, vol. 17, No. 8, pp. 1737-1739, Aug. 2005.
Lagasse et al., "Optical Carrier Filtering for High Dynamic Range Fibre Optic Links", Electronics Letters, vol. 30, No. 25, pp. 2157-2158, Dec. 1994.
Blais et al., "Optical Single Sideband Modulation Using an Ultranarrow Dual-Transmission-Band Fiber Bragg Grating", IEEE Photonics Technology Letters, vol. 18, No. 21, pp. 2230-2232, Nov. 2006.
Shen et al., "Optical Single Sideband Modulation of 11-GHz RoF System Using Stimulated Brillouin Scattering", IEEE Photonics Technology Letters, vol. 17, No. 6, pp. 1277-1279, Jun. 2005.
Hung et al., "Suppressed Carrier Optical Transmitter with Intracavity Modulation for Coherent Analog Optical Links", Department of Electrical Engineering, UCLA, Optical Society of America, 2007 (3 pages).

* cited by examiner

*Primary Examiner* — Hanh Phan
(74) *Attorney, Agent, or Firm* — Yee & Associates, P.C.

(57) ABSTRACT

A photonic system and method are provided. The system includes an optical source configured to generate a carrier signal; and a modulator configured to modulate the carrier signal with a radio frequency, ("RF") input signal to generate a modulated signal. The system also includes an optical filter configured to filter the modulated signal to generate a vestigial sideband modulated signal; and an optical detector configured to demodulate the vestigial sideband signal to generate an RF output signal. The system further includes a wavelength controller module configured to set an operating parameter of the optical source.

24 Claims, 6 Drawing Sheets

SYSTEM AND METHOD FOR A PHOTONIC SYSTEM

TECHNICAL FIELD

The present disclosure relates to photonic systems and devices.

BACKGROUND

Microwave-photonic optical links are commonly used in various communication applications. Typically, a microwave-photonic optical link transmits radio frequency (RF) signals over optical fiber links. RF over optical fiber transmissions (may also be referred to as "RoF" transmissions) are used in many applications, such as broad-band wireless access networks, wireless sensor networks, and radar and satellite communication systems.

One challenge in using optical fiber for RF transmission is that signal degradation may occur from a wide double sideband signal due to dispersion in the optical fiber.

Another challenge is that a large carrier signal level may be greater than a receive detector saturation level and a large carrier may also cause "Stimulated Brillouin Scattering" in long fibers. Stimulated Brillouin Scattering is caused by acoustical phonons generated from continuous-wave electromagnetic waves traveling in an optical fiber. The electromagnetic optical field is coupled to acoustic waves through the process of electrostriction, which sets up an index grating that scatters the incoming optical signal in the backwards direction through Bragg diffraction. This phenomenon is known as Stimulated Brillouin Scattering.

Typically, RF photonic devices use an external modulator for modulating a signal. One commonly used modulator is a lithium-niobate based Mach-Zehnder modulator. The Mach-Zehnder modulator uses a control circuit to keep it at a particular operating point, which has limitations.

It is desirable to have the flexibility to use a Mach-Zehnder modulator or a simple phase modulator, for communication systems using microwave photonic optical links.

SUMMARY

In one embodiment, a photonic system is provided. The system includes an optical source configured to generate a carrier signal; and a modulator configured to modulate the carrier signal with a radio frequency ("RF") input signal to generate a modulated signal. The system also includes an optical filter configured to filter the modulated signal to generate a vestigial sideband modulated signal; and an optical detector configured to demodulate the vestigial sideband signal to generate an RF output signal. The system further includes a wavelength controller module configured to set operating parameters for the optical source.

In one embodiment, a photonic system is provided with an optical source configured to generate a carrier signal; a first coupler configured to receive the carrier signal from the optical source and to generate a first configured carrier signal and a second configured carrier signal; and a modulator configured to modulate the first configured carrier signal with a radio frequency ("RF") input signal to generate a modulated signal. The system also includes an optical filter configured to filter the modulated signal to generate a vestigial sideband signal; a second coupler configured for coupling the vestigial sideband signal and the second configured carrier signal received from the first coupler to generate a coupled vestigial sideband signal plus a coupled carrier signal; and a balanced optical detector configured for heterodyning the coupled vestigial sideband signal plus a coupled carrier signal to generate an RF output signal. The system further includes a wavelength controller module configured to set an operating parameter for the optical source to generate the carrier signal.

In yet another embodiment, a photonic system is provided. The system includes an optical source configured to generate a carrier signal; a modulator configured to modulate the carrier signal with a radio frequency (RF) input signal to generate a modulated signal; and an optical filter configured to filter the modulated signal to generate a vestigial sideband signal. The system also includes a local oscillator configured to generate a local oscillator signal; a coupler configured for coupling the vestigial sideband signal with the local oscillator signal to generate a coupled vestigial sideband signal and a coupled local oscillator signal; and a balanced optical detector for heterodyning the coupled vestigial sideband signal with the coupled local oscillator signal to generate a frequency converted RF output signal. The system further includes a wavelength controller module configured to set an operating parameter for the optical source.

In yet another embodiment, a method for operating a photonic system is provided. The method includes: (a) generating an optical signal from an optical source; (b) modulating the optical signal with an input radio frequency (RF) signal to generate a modulated signal; (c) transmitting the modulated signal to an optical filter, wherein the modulated signal is filtered to generate a vestigial sideband signal;(d) transmitting the vestigial sideband signal to an optical detector, where the optical detector demodulates the vestigial sideband signal to generate an output RF signal; and (e) configuring the optical source based on a reference signal and a feedback signal.

This brief summary has been provided so that the nature of this disclosure may be understood quickly. A more complete understanding of the disclosure can be obtained by reference to the following detailed description of the various embodiments thereof in connection with the attached drawings.

DETAILED DESCRIPTION

The following definitions are provided as they are typically (but not exclusively) used in the field of photonics, implementing the various adaptive embodiments disclosed herein.

Definitions

"Amplitude modulation": Amplitude modulation produces a modulated output signal which has a carrier signal with varying amplitude and whose bandwidth is greater than an original baseband signal.

"Demodulator": Demodulator is a device/component that performs the inverse operation of modulation. A demodulator may also be referred to as a detector.

"Double sideband modulation" ("DSB"): DSB modulation may occur when a carrier signal of a higher frequency is multiplied by a message signal.

"Heterodyning": Heterodyning means generation of new frequencies by mixing, or multiplying a plurality of oscillating waveforms. For example, mixing at least two frequencies may create two new frequencies; one based on the sum of the two frequencies and the other based on the difference. Heterodyning is useful for frequency conversion, modulation, and demodulation of signals.

"Modulation": Modulation means a process of varying a periodic waveform of a signal to convey a message. In one example, a high-frequency sinusoid waveform may be used as a carrier signal. The parameters of the sinusoid waveform, for example, amplitude ("volume"), phase ("timing") and frequency ("pitch"), may be modified to obtain a modulated signal.

"Modulator": A Modulator is a device that performs modulation.

"Sideband": In electronic signal transmission, a sideband is the portion of a modulated carrier wave that is either above or below a carrier signal. The portion above the carrier signal may be referred to as the upper sideband; and the portion below may be referred to as the lower sideband. In regular amplitude modulation (AM) transmission, both sidebands may be used to carry a message. In some forms of transmission, one sideband is removed (single-sideband transmission) or the carrier may be completely or partial suppressed.

"Single sideband modulation": In Single sideband modulation (may also be referred to as "SSB") one sideband of a modulated carrier is removed. SSB avoids bandwidth doubling, and enables efficient use of bandwidth.

"Vestigial sideband modulation": Vestigial sideband modulation is similar to Single Sideband Modulation, except that a vestige of the carrier power remains.

To facilitate an understanding of the various embodiments, the general architecture and operation of a RF Photonic system will be described. The specific architecture and operation of the various embodiments of the RF Photonic System will then be described with reference to the general architecture.

Figure 1:
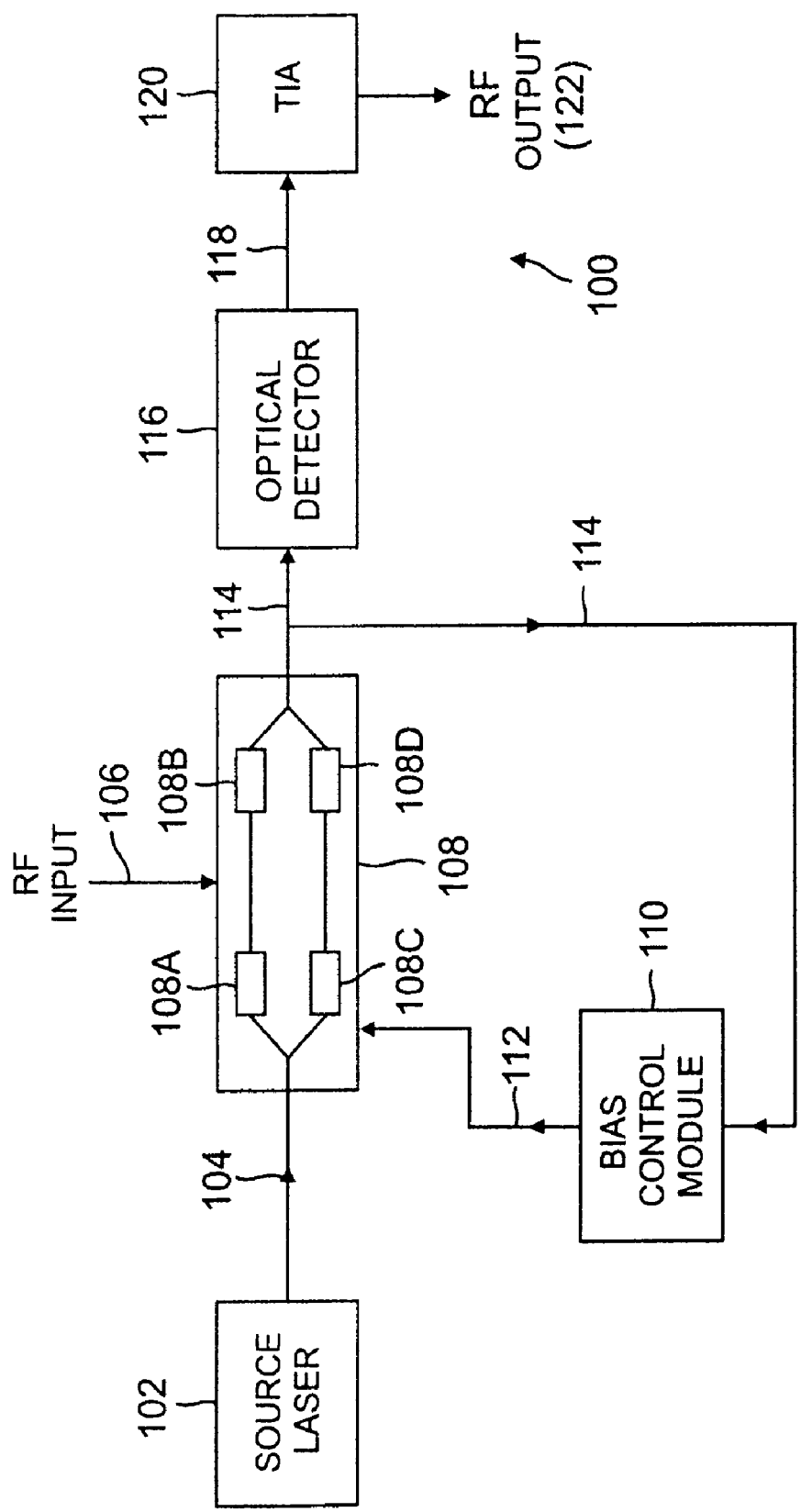
FIG. 1 shows a diagram of a general RF photonic system.

FIG. 1 shows a general photonic system 100 having an optical light source (also referred to as laser source) 102 that produces an optical signal 104 (also referred to as "optical carrier" or "carrier signal" 104) that is fed into a modulator 108. Modulator 108 may be a Mach-Zehnder modulator (may also be referred to as "MZM") that uses phase modulators 108A-108D.

An RF signal 106 is input to modulator 108. Modulator 108 using phase modulators 108A-108D produces an amplitude modulated signal 114. The modulated signal 114 may be a double sideband (DSB) amplitude modulated signal with feedback provided to bias control module 110. Bias control module 110, based on signal 114, generates a signal 112. Signal 112 may be used to establish the operating point for modulator 108.

The modulated signal 114 is also sent to an optical detector 116. Optical detector 116 demodulates signal 114 to generate an RF signal 118. The RF signal 118 may then be amplified by a trans-impedance amplifier (TIA) 120 that generates an amplified RF output signal 122.

For signal modulation, a Mach-Zehnder modulator (MZM) operating at the most linear quadrature point will produce a large carrier signal. This can lead to saturation of the optical detector 116 and Stimulated Brillouin Scattering on long fiber transmission for photonic system 100. The embodiments described herein overcome the shortcomings of photonic system 100.

In one embodiment, a RF photonic system with control over a source laser wavelength is provided. By controlling the source laser wavelength, the carrier power may be set to desired level by using the filter edge rejection while obtaining a smaller bandwidth for optimal performance. In one embodiment, the RF photonic system may use a single phase modulator to simplify the design of the system. If second harmonic performance is desired, the RF Photonic system may use a phase locked laser at the demodulator that locks to the carrier signal. An MZM may also be used if second harmonic performance is desired.

In another embodiment, a RF photonic system is provided. The photonic system provides vestigial sideband (VSB) modulation using an optical filter to generate a VSB modulated signal. The VSB modulated signal is provided to an optical detector for demodulation. The system also uses a wavelength controller module that enables setting the carrier signal to the desired level.

Figure 2:
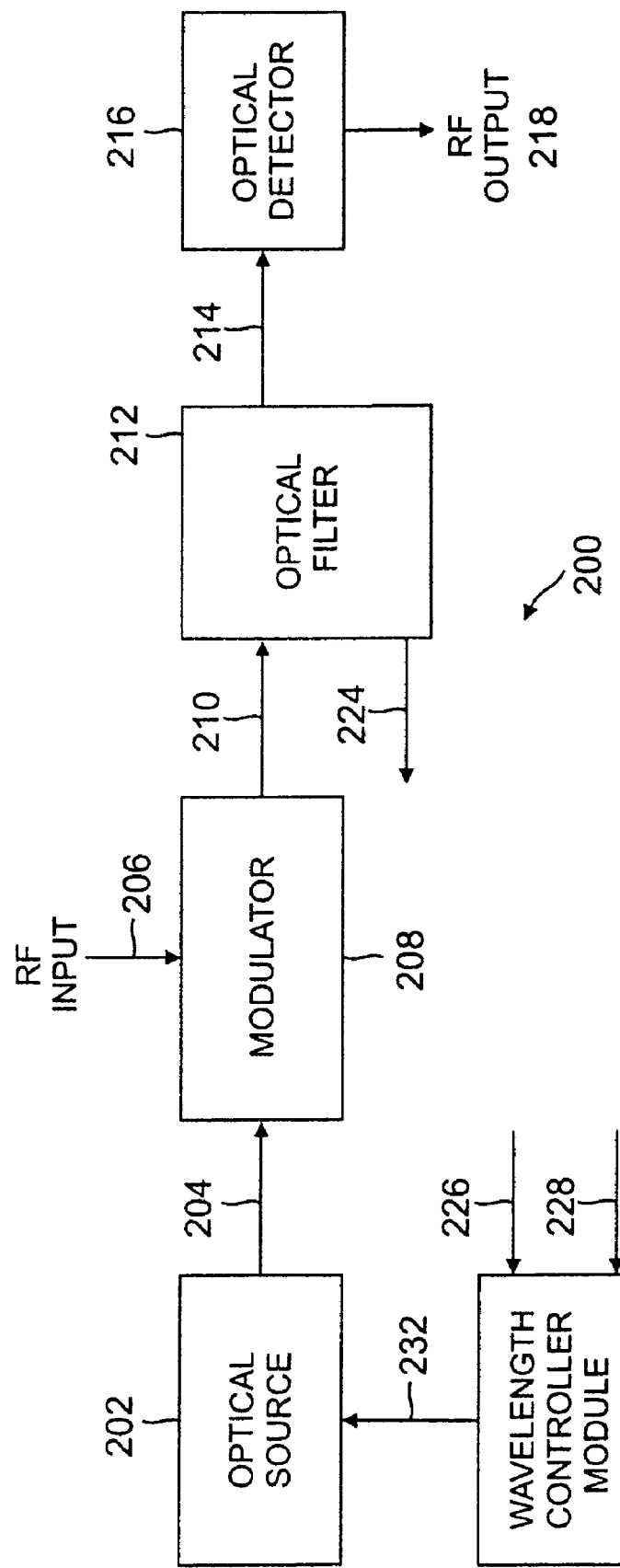
FIG. 2 shows a diagram of an RF photonic system, according to one embodiment.

FIG. 2 shows a RF photonic system 200 with vestigial sideband (VSB) modulation, according to one embodiment. In the RF photonic system 200, the optical source 202 generates an optical signal 204 (may also be referred to as a "carrier signal"). Signal 204 is sent to a modulator 208. Modulator 208 receives an input RF signal 206. Modulator 208 may be a single phase modulator that modulates signal 204 with input RF signal 206 to generate an output modulated signal 210. The modulated signal 210 may be a phase modulated signal or an amplitude modulated signal. For example, modulator 208 may also include a MZM (108) for generating an amplitude modulated signal.

The phase or amplitude modulated signal 210 is sent to an optical filter 212. Optical filter 212 may be a band-pass or band-stop filter that removes a sideband and part of the carrier to generate a vestigial sideband (VSB) signal 214. In one embodiment, optical filter 212 may be a two port filter, having a receive port (not shown) for receiving an input signal (e.g., 210) and a transmit port (not shown) for transmitting a VSB signal (214).

In another embodiment, the optical filter 212 may also be a three or a four port filter. FIG. 2 shows a three port optical filter having: a receive port for receiving the modulated signal 210, a transmit port for transmitting the VSB signal 214, and a reflection port for the reflected-path signal 224 of the receive port.

VSB signal 214 is forwarded to optical detector 216 that demodulates the signal to generate an RF output signal 218. In one embodiment, a trans-impedance amplifier (not shown) may be used to amplify the RF output signal 218.

RF Photonic system 200 includes a wavelength controller module 230 that may set an operating parameter for optical source 202. For example, the wavelength controller module 230 may set the operating wavelength for optical source 202. Wavelength controller module 230 may comprise reference detection circuit and optics (not shown) for receiving reference signal(s) 226. Wavelength controller module 230 may also comprise carrier detection circuit and optics (not shown) for receiving feedback signal(s) 228.

Use of the term "reference signal" and "feedback signal" in this and other embodiments is not limited to one signal. In various embodiments, one or more different signals may be used separately or together as a reference signal. Similarly, one or more different signals may be used separately or together as a feedback signal. For example, reference signal 226 may be a portion of signal 204 from the optical source 202, or modulated signal 210 from modulator 208, or reflected-path signal 224 from optical filter 212, or more than one of signals 204, 210, or 224 may be used together for the reference signal 226. Feedback signal 228 may be carrier detected VSB signal 214 from optical filter 212, or the output carrier detected signal at RF output signal 218 from optical detector 216.

Wavelength controller module 230 may compare the reference signal 226 and the feedback signal 228, and based on the comparison generates signal 232. Signal 232 may be used for controlling the operating parameters of optical source 202. For example, signal 232 may enable control of the wavelength of optical source 202 thereby locking the wavelength to optical filter 212 to provide a set carrier signal level on signal 214 at the output of the optical filter 212.

It is within the scope of the present disclosure to use an optical coupler or an optical circulator for redirecting signals within the RF photonic system 200. For example, an optical coupler (not shown) may be used for coupling a portion of carrier signal 204 from the optical source 202 for use as a reference signal 226.

Figure 3:
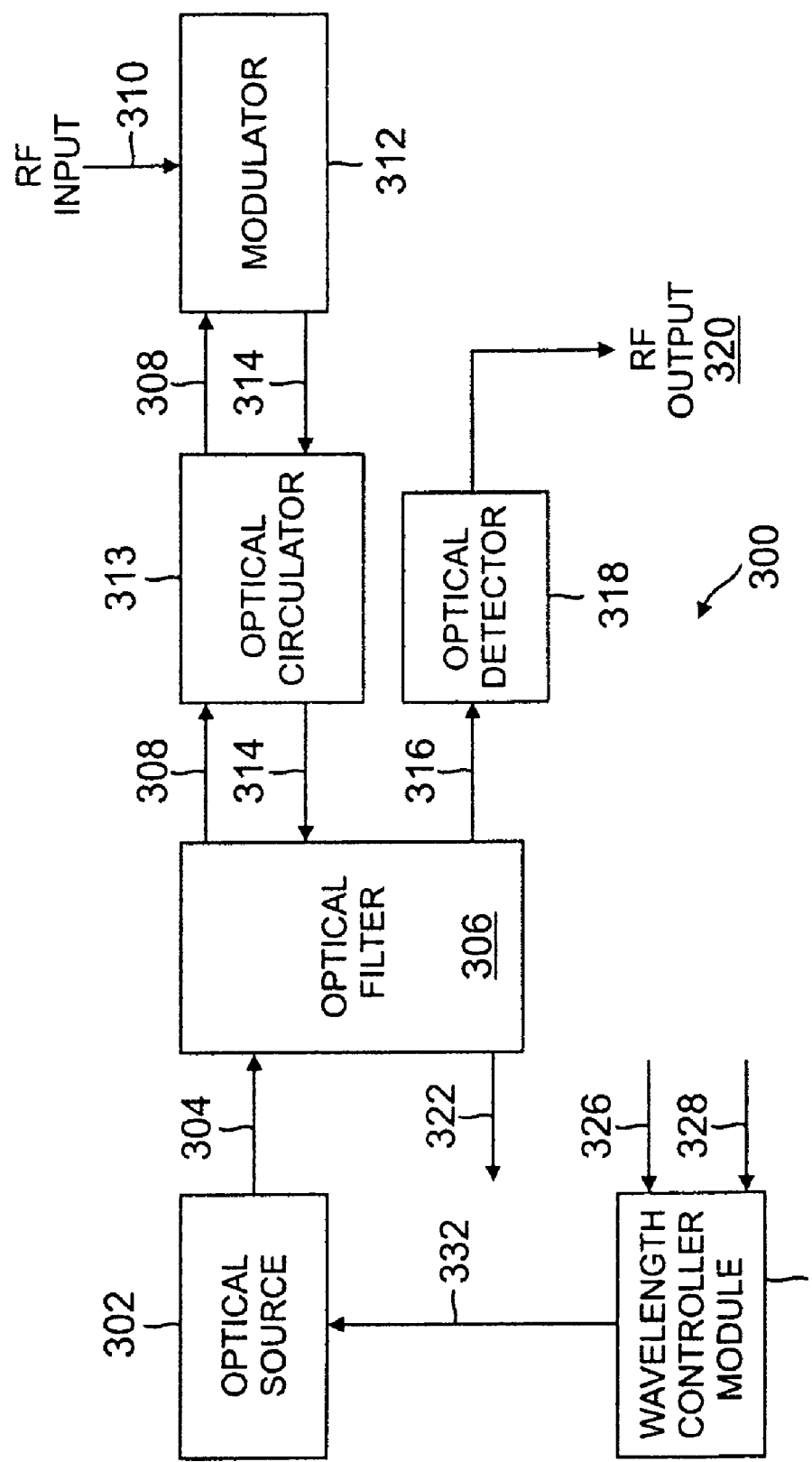
FIG. 3 shows a diagram of yet another example of a RF photonic system, according to another embodiment.

FIG. 3 shows yet another embodiment of RF photonic system 300 (also referred to as "System 300"). System 300 uses an approach which provides laser side mode rejection for better performance.

System 300 includes an optical source 302 that generates a carrier signal 304 (also referred to as "optical signal 304" or "Signal 304"). Signal 304 is sent to an optical filter 306 that filters the carrier signal 304 to generate a sideband rejected signal 308. The sideband rejected signal 308 is sent via an optical circulator 313 to modulator 312 where it is modulated with a RF input signal 310.

The modulated signal 314 is sent to an optical circulator 313, which sends the signal 314 in reverse on the same optical path as 308, back into optical filter 306, where the signal is further filtered to generate a vestigial sideband (VSB) signal 316. VSB signal 316 is then sent to optical detector 318, which demodulates the signal to generate an RF output signal 320. RF output signal 320 may be amplified by a transimpedance amplifier (not shown) to generate an amplified RF output signal.

System 300 also includes wavelength controller module 330 that may set an operating parameter for the optical source 302. For example, wavelength controller module 330 may set an operating parameter to control the wavelength of optical source 302. Wavelength controller module 330 receives reference signals 326 and feedback signal 328 to generate signal 332. Signal 332 may then be used to control the wavelength of optical source 302.

Reference signal 326 may include a portion of signal 304 from optical source 302, reflected signal 322 from optical filter 306, and/or sideband rejected signal 308. Feedback signal 328 may include carrier detected signal of the VSB signal 316 from optical filter 306 and/or the RF output signal 320.

It is within the scope of the present disclosure to use an optical coupler or an optical circulator for redirecting signals within the RF photonic system 300. For example, it is within the scope of the disclosure to use an optical circulator for redirecting reflected carrier signal 322 from the optical filter 306 to use as a reference signal 326.

Figure 4:
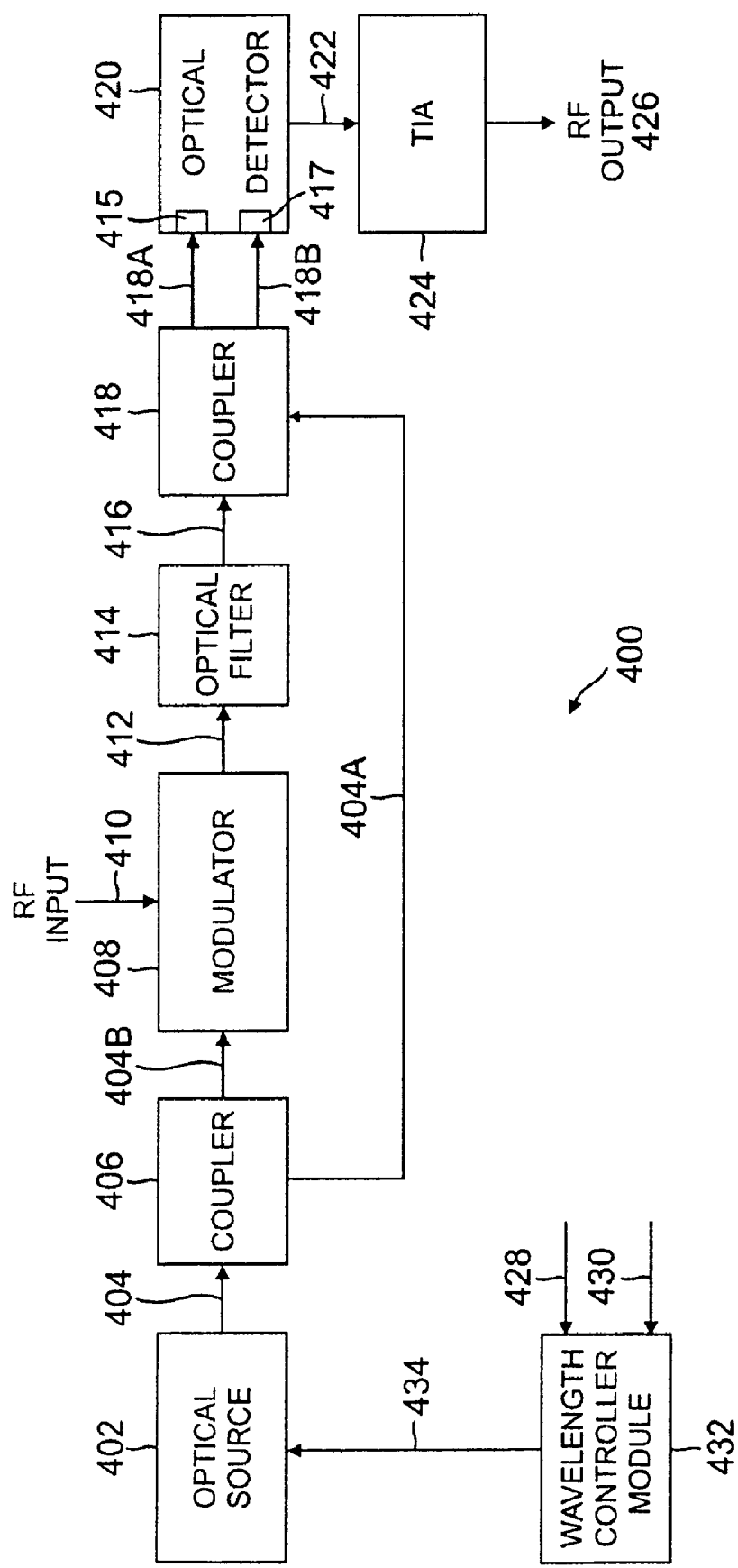
FIG. 4 shows a diagram of an RF photonic system in a self heterodyne configuration, according to one embodiment.

FIG. 4 shows a RF photonic system 400 (also referred to as "System 400"), in yet another embodiment. System 400 may include a self-heterodyne configuration where source optical power (i.e. laser power) is separated and then recombined in a balanced detector configuration to generate signals used for relative intensity noise (RIN) reduction. In system 400, a source optical signal acts as a local oscillator for a modulated and filtered signal generated as described below.

System 400 includes an optical source (for example, a laser source) 402 that outputs optical signal 404 (also referred to as "carrier signal" or "Signal 404"). Signal 404 is input to an optical coupler 406 that generates coupled signals 404A and 404B (also referred to as "Signal 404A" and "Signal 404B"). Signal 404B is input to modulator 408 that also receives RF input signal 410. Modulator 408 modulates coupled carrier signal 404B with the RF input signal 410. The modulated signal 412 is sent to optical filter 414 that filters a sideband plus some of the carrier to output a vestigial sideband (VSB) signal 416.

VSB signal 416 is then sent to an optical coupler 418. Optical coupler 418 also receives a coupled portion (404A) of the carrier input from optical coupler 406. Optical coupler 418 generates coupled carrier signal plus VSB signals 418A and 418B. Signals 418A and 418B are input to balanced optical detector 420. Detector 420 includes detectors 415 and 417. Detector 415 receives signal 418A and detector 417 receives signal 418B, respectively.

Typically, signal 404A is larger than the VSB signal 416. The RIN of the large signal 404A is cancelled by the 180° phase shift due to combination of the optical coupler 418 and detectors 415 and 417.

Output 422 from the optical detectors (415 and 417) is sent to TIA 424 that amplifies the signal to generate a RF output signal 426.

System 400 includes a wavelength controller module 432 that receives reference signal 428 and feedback signal 430 to generate signal 434. Signal 434 may be used to set an operating parameter of optical source 402. For example, wavelength controller module 432 may set a parameter to control the wavelength of optical source 402.

Reference signal 428 may include a coupled portion of optical signal 404 from optical source 402 (i.e., 404A or 404B or any other coupled signal), the modulated signal 412 from modulator 408, and/or the reflected modulated signal 412 from optical filter 414. Feedback signal 430 may include carrier detected signal of the VSB signal 416 from optical filter 414 and/or the carrier detected output signal of the RF output signal 426.

Figure 5:
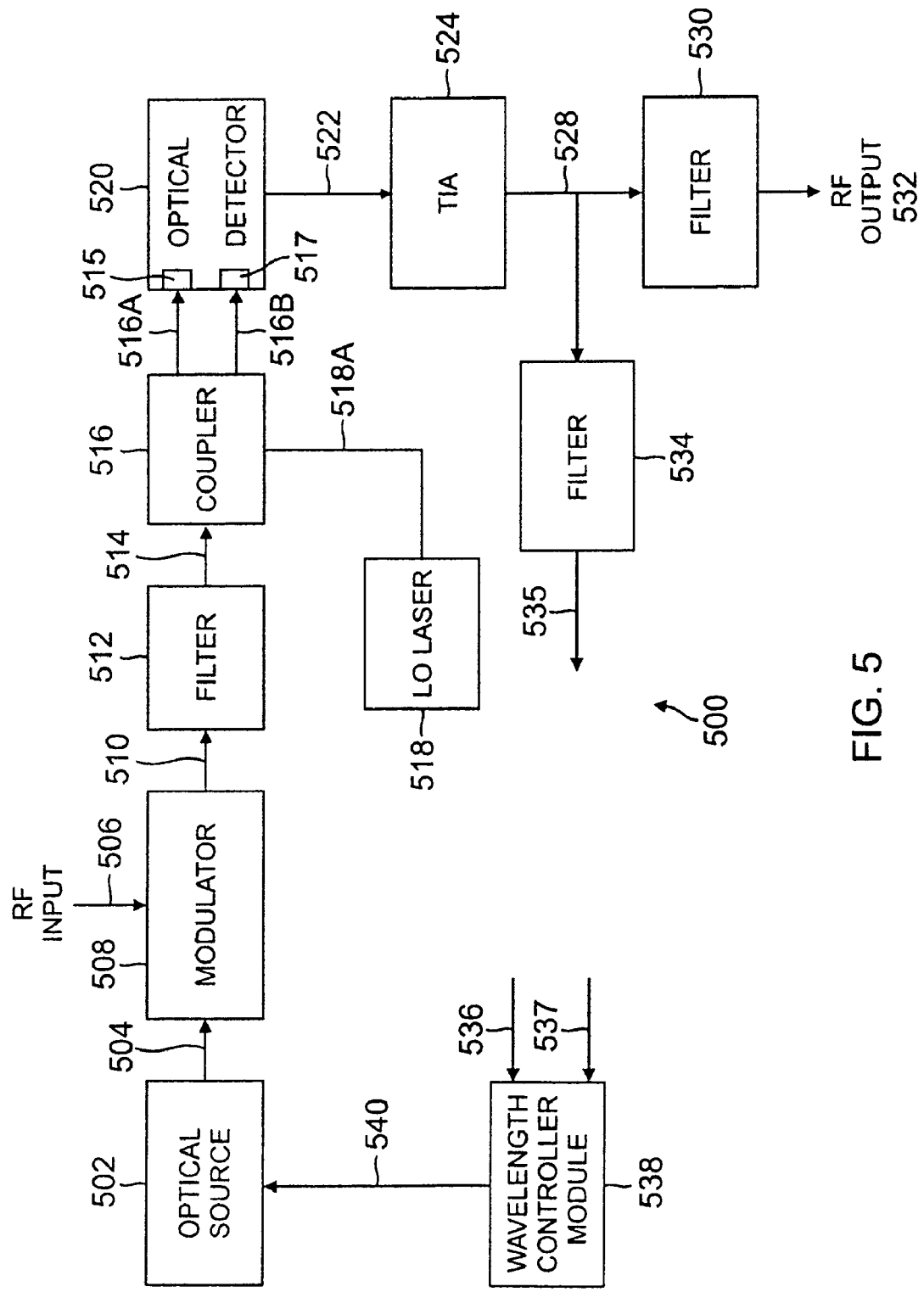
FIG. 5 shows a diagram of an RF photonic system in a heterodyne configuration, according to one embodiment.

FIG. 5 shows a heterodyne configuration system 500 (also referred to as system 500), according to another embodiment. System 500 uses an independent local oscillator for signal conversion. The local oscillator signal is either heterodyned with the VSB signal to provide a frequency converted output signal from an optical detector or is phase locked with the VSB signal to provide a minimized second harmonic output signal from an optical detector. A wavelength controller module uses feedback to control the laser wavelength and keep it located at a desired rejection point of the filter.

System 500 includes an optical source 502 that generates an output signal (also referred to as "optical signal" or "carrier signal") 504. Signal 504 is input to modulator 508 that also receives an RF input signal 506. Modulator 508 generates a modulated signal 510 that is sent to optical filter 512. The optical filter 512 generates a filtered VSB signal 514.

The filtered VSB signal 514 is then sent to a balanced optical detector 520 (similar to detector 420, FIG. 4) via optical coupler 516 (similar to optical coupler 418). Optical coupler 516 also receives a local oscillator signal 518A from a local oscillator laser 518.

Optical coupler 516 outputs signal 516A and 516B, which are sent to optical detector 520. Optical detector includes two detectors 515 and 517. Signal 516B is sent to detector 517 while coupled VSB signal 516A is sent to detector 515. Typically, the local oscillator signal 518A is larger than the filtered VSB signal 514. The RIN of the large local oscillator signal 518A is cancelled by 180° phase shift of the optical coupler 516 and detectors 515 and 517 combination. In one embodiment, this detection approach enables frequency conversion. In another embodiment, this approach enables second harmonic performance.

Output 522 from the optical detectors 515 and 517 is sent to TIA 524 that amplifies the signal to generate RF output signal 528. RF output signal 528 may then be sent to a filter 530 to filter out a desired signal frequency. The filtered RF output signal 532 is output from optical filter 530. RF output signal 528 may also be sent to optical filter 534 that provides a filtered feedback signal 535 to the wavelength controller module 538.

System 500 includes a wavelength controller module 538 that receives reference signals 536 and feedback signal 537 to generate signal 540. Signal 540 may then be used to set an operating parameter of optical source 502. For example, wavelength controller module 538 may set an operating parameter to control the wavelength of optical source 502. Reference signal 536 may include a portion of signal 504 from optical source 502, reflected signal 510 from optical filter 512, and/or sideband rejected signal 514. Feedback signal 537 may include carrier detected signal of the filtered VSB signal 514 from optical filter 512 and/or the carrier detected signal 535 which may be a filtered version of RF output signal 528 filtered by filter 534.

Figure 6:
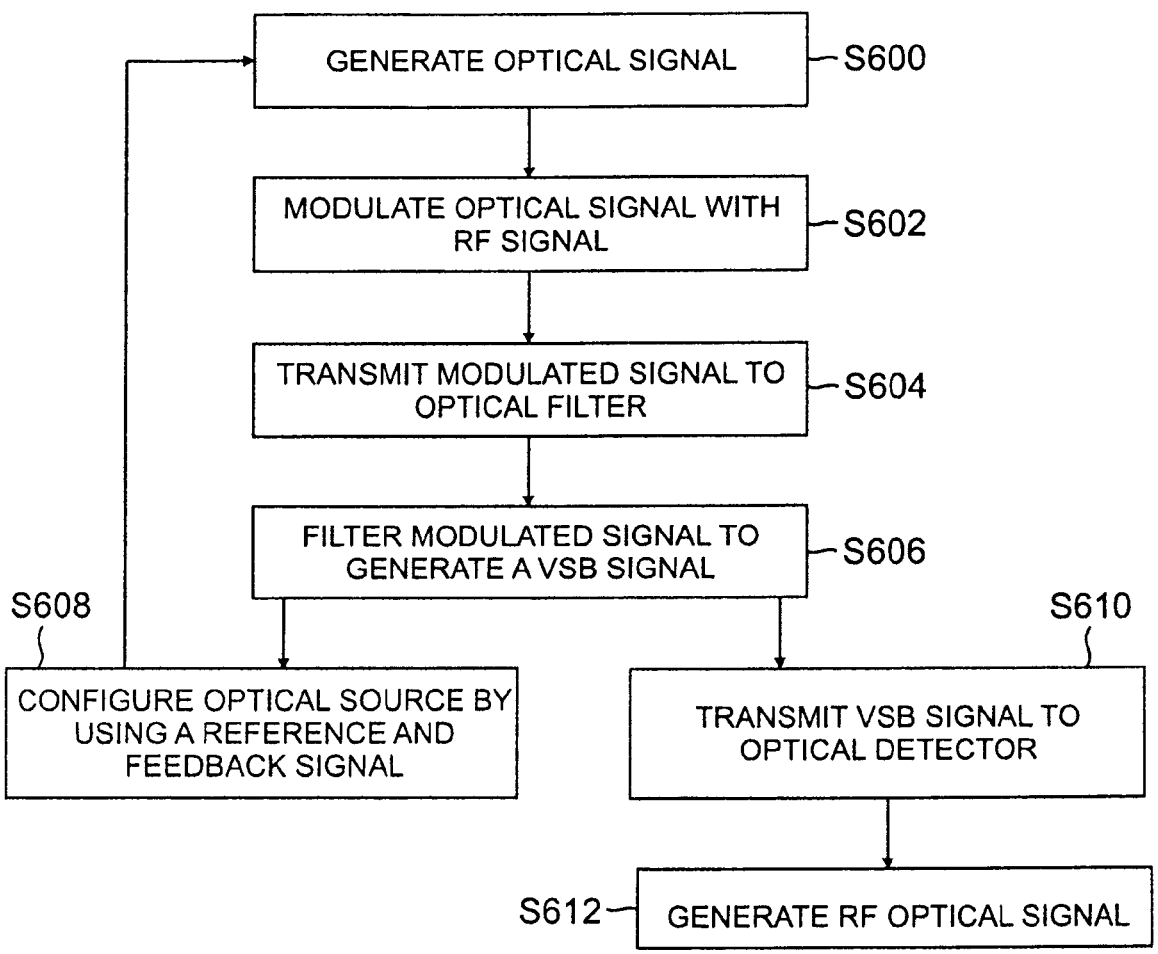
FIG. 6 shows a flowchart of a method for controlling a RF photonic system, according to one embodiment.

FIG. 6 shows a process for controlling a RF photonic system, according to one embodiment. The process begins in block S600, when an optical source (for example optical source 202, 302) generates an optical signal (for example 204).

In block S602, a modulator (For example, 208) modulates optical signal (for example 204) with input RF signal (206) to generate an output modulated signal (for example 210).

In block S604, the output modulated signal is sent to an optical filter (for example 212). In block S606, the optical filter removes a sideband and part of the optical source signal to generate vestigial sideband (VSB) signal (for example, 214).

In block S610, optical detector (for example 216) receives VSB signal (for example 214). Optical detector demodulates the VSB signal to generate an RF output signal (for example 218) in block S612.

In block S608, the optical source (for example 202) that generates optical signal in block S600 is configured using a reference signal and a feedback signal. Reference signal may be signal from block S600 (for example, 204), or modulated output signal from block S602 (for example 210). Feedback signal may be VSB signal from block S606, or RF output signal from block S612 (for example, 218). In block S608, based on the feedback and reference signal operating parameter for the optical source are set (S600).

It is to be understood that though the present description relates to use of a single-phase modulator as an example, it is within the scope of the present description to use an amplitude modulator. Phase modulation as well as amplitude modulation is converted to a signal which can be easily detected or frequency converted.

Although the present disclosure has been described with reference to specific embodiments, these embodiments are illustrative only and not limiting. Many other applications and embodiments of the present disclosure will be apparent in light of this disclosure and the following claims.

What is claimed is:

1. A photonic system, comprising:
   an optical source configured to generate a carrier signal;
   an optical filter configured to filter the carrier signal to generate a sideband rejected signal;
   an optical circulator configured to receive the sideband rejected signal from the optical filter and to send the sideband rejected signal to a modulator configured to modulate the carrier signal with a radio frequency ("RF") input signal to generate a modulated signal and to send the modulated signal to the optical circulator, wherein the optical circulator sends the modulated signal in reverse back to the optical filter for further filtering to generate a vestigial sideband modulated signal;
   an optical detector configured to receive the vestigial sideband modulated signal and to demodulate the vestigial sideband modulated signal to generate an RF output signal; and
   a wavelength controller module configured to set an operating parameter to control the wavelength by receiving and using a reference signal and a feedback signal to generate a control signal for the optical source, wherein the reference signal includes a portion of the carrier signal, a reflected signal from the optical filter, and the sideband rejected signal, and wherein the feedback signal includes a carrier detected signal of the vestigial sideband modulated signal, and the RF output signal.

2. The photonic system of claim 1, wherein the wavelength controller module sets the operating parameter for the optical source based on a feedback signal from the optical filter.

3. The photonic system of claim 1, wherein the wavelength controller module is configured to control a wavelength of the carrier signal based on a feedback signal from the optical filter, the RF output signal, or a combination thereof.

4. The photonic system of claim 1, wherein the wavelength controller module is configured to control a wavelength of the carrier signal based on feedback signal and a reference signal.

5. The photonic system of claim 4, wherein the reference signal is one or more of the carrier signal received from the optical source, the signal from the modulator, a reflected signal from the optical filter, or a combination thereof.

6. The photonic system of claim 1, wherein the modulator is a single phase modulator, amplitude modulator, or a Mach Zehnder modulator.

7. A photonic system, comprising:
   an optical source configured to generate a carrier signal;
   a first coupler configured to receive the carrier signal from the optical source and generate a first configured carrier signal and a second configured carrier signal;
   a modulator configured to modulate the first configured carrier signal with a radio frequency ("RF") input signal to generate a modulated signal;
   an optical filter configured to filter the modulated signal to generate a vestigial sideband signal;
   a second coupler configured for receiving a coupled portion of the coupling the vestigial sideband signal and the second configured carrier signal received from the first coupler to generate a first vestigial sideband signal, a second vestigial sideband signal, and a coupled carrier signal;
   a balanced optical detector having a first detector for receiving the first vestigial sideband signal and a second detector for receiving the second vestigial sideband signal, the first detector and the second detector configured for heterodyning the first vestigial sideband signal, the second coupled vestigial sideband signal, and the coupled carrier signal to generate an RF output signal, wherein a relative intensity noise (RIN) of the coupled carrier signal is cancelled by a one hundred and eighty degree phase shift due to a combination of the second coupler, the first detector, and the second detector; and a wavelength controller module configured to set an operating parameter to control the wavelength by receiving and using a reference signal and a feedback signal to generate a control signal for the optical source to generate the carrier signal, wherein the reference signal includes a coupled portion of the carrier signal, a modulated signal from the modulator, and a reflected modulated signal from the optical filter, and wherein the feedback signal includes a carrier detected signal of a vestigial sideband modulated signal and a carrier detected output signal of the RF output signal.

8. The photonic system of claim 7, wherein the wavelength controller module sets the operating parameter for the optical source based on a feedback signal from the optical filter.

9. The photonic system of claim 7, wherein the wavelength controller module is configured to control a wavelength of the carrier signal based on a feedback signal from the optical filter, the RF output signal, or a combination thereof.

10. The photonic system of claim 7, wherein the wavelength controller module is configured to control a wavelength of the carrier signal based on a feedback signal and a reference signal.

11. The photonic system of claim 10, wherein the reference signal is one or more of the carrier signal received from the optical source, the signal from the modulator, a reflected signal from the optical filter, or a combination thereof.

12. The photonic system of claim 7, wherein the modulator is a single phase modulator, amplitude modulator, or a Mach Zehnder modulator.

13. The photonic system of claim 7, wherein the balanced optical detector comprises a first detector and a second detector, the first detector configured to receive a first coupler output with the coupled vestigial sideband signal plus the coupled carrier signal, and the second detector configured to receive a second coupler output with the coupled vestigial sideband signal plus the coupled carrier signal.

14. A photonic system, comprising:
an optical source configured to generate a carrier signal;
a modulator configured to modulate the carrier signal with a radio frequency (RF) input signal to generate a modulated signal;
an optical filter configured to filter the modulated signal to generate a filtered vestigial sideband signal;
a local oscillator configured to generate a local oscillator signal;
a balanced optical detector configured to receive the filtered vestigial sideband signal via a coupler configured for coupling the filtered vestigial sideband signal with the local oscillator signal to generate a first coupled vestigial sideband signal and a second coupled vestigial sideband signal;
a balanced optical detector having a first detector for receiving the first vestigial sideband signal and a second detector for receiving the second vestigial sideband signal, the first detector and the second detector configured for heterodyning the first vestigial sideband signal and the second vestigial sideband signal with the local oscillator signal to generate a frequency converted RF output signal, wherein a relative intensity noise (RIN) of the local oscillator signal is cancelled by a one hundred and eighty degree phase shift due to a combination of the coupler, the first detector, and the second detector; and a wavelength controller module configured to set an operating parameter for the optical source, wherein a reference signal includes a coupled portion of the carrier signal, a modulated signal from the modulator, and a reflected modulated signal from the optical filter, and wherein a feedback signal includes a carrier detected signal of a vestigial sideband modulated signal and a carrier detected output signal of the RF output signal.

15. The photonic system of claim 14, wherein the wavelength controller module is configured to set an operating parameter for the optical source based on a feedback signal from the optical filter.

16. The photonic system of claim 14, wherein the wavelength controller module is configured to control a wavelength of the carrier signal based on a feedback signal from the optical filter, the RF output signal, or a combination thereof.

17. The photonic system of claim 14, wherein the wavelength controller module is configured to control a wavelength of the carrier signal based on a feedback signal and a reference signal.

18. The photonic system of claim 17, wherein the reference signal is one or more of the carrier signal received from the optical source, the signal from the modulator, a reflected signal from the optical filter, and a combination thereof.

19. The photonic system of claim 14, wherein the modulator is a single phase modulator, amplitude modulator, or a Mach Zehnder modulator.

20. The photonic system of claim 14, wherein the balanced optical detector comprises a first detector and a second detector, the first detector configured to receive a first coupler output with the coupled vestigial sideband signal plus the coupled laser oscillator and the second detector configured to receive a second coupler output with the coupled vestigial sideband signal plus a coupled laser oscillator.

21. The photonic system of claim 14, wherein the modulator is a single phase modulator, an amplitude modulator or a Mach Zehnder modulator.

22. A method for operating a photonic system, the method comprising:
(a) generating an optical signal from an optical source;
(b) modulating the optical signal with an input radio frequency (RF) signal to generate a modulated signal;
(c) transmitting the modulated signal to an optical filter, wherein the optical filter filters the modulated signal to generate a vestigial sideband signal;
(d) transmitting the vestigial sideband signal to an optical detector, where the optical detector demodulates the vestigial sideband signal to generate an output RF signal; and
(e) configuring the optical source based on a reference signal and a feedback signal wherein the feedback signal is the RF output signal generated in step (d).

23. The method of claim 22, wherein the step of configuring the optical source includes setting an operating parameter for the optical source.

24. The method of claim 22, wherein the reference signal is the optical signal generated in step (a) or the modulated signal generated in step (b) of claim 22.

* * * * *